(12) United States Patent
Colin

(10) Patent No.: US 11,683,275 B2
(45) Date of Patent: Jun. 20, 2023

(54) DEVICE AND METHOD FOR INTERCONNECTING TWO SUBNETWORKS

(71) Applicant: SAGEMCOM BROADBAND SAS, Rueil-Malmaison (FR)

(72) Inventor: Stéphane Colin, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 617 days.

(21) Appl. No.: 14/403,439

(22) PCT Filed: May 17, 2013

(86) PCT No.: PCT/EP2013/060283
§ 371 (c)(1),
(2) Date: Nov. 24, 2014

(87) PCT Pub. No.: WO2013/174758
PCT Pub. Date: Nov. 28, 2013

(65) Prior Publication Data
US 2015/0120897 A1   Apr. 30, 2015

(30) Foreign Application Priority Data

May 22, 2012   (FR) ..................... 12/54654

(51) Int. Cl.
*H04L 49/00* (2022.01)
*H04L 61/2585* (2022.01)
(Continued)

(52) U.S. Cl.
CPC ........ *H04L 49/309* (2013.01); *H04L 12/2809* (2013.01); *H04L 12/2832* (2013.01);
(Continued)

(58) Field of Classification Search
CPC .................................................. H04L 61/2528
(Continued)

(56) References Cited

U.S. PATENT DOCUMENTS

2006/0215684 A1* 9/2006 Capone ................. H04L 63/029
                                                              370/437
2008/0235358 A1   9/2008 Moribe et al.
(Continued)

OTHER PUBLICATIONS

"UPnPTM Device Architecture 1.1;" UPnp Forum; Oct. 15, 2008.
(Continued)

*Primary Examiner* — Kevin S Mai
(74) *Attorney, Agent, or Firm* — Oliff PLC

(57) ABSTRACT

An interconnection device for interconnecting two subnetworks, on which UPnP devices are connected: determines actual IP addresses and port numbers of servers of the UPnP device; allocates a port number to each server, establishes a connection with a UPnP device of the femtocell and a connection with a UPnP device of the local area network; replaces, in frames received via one of said connections, each actual server IP address and port number allocated by the interconnection device to said server; and replaces, in frames received via one of said connections, each actual IP address and port number with an IP address of the interconnection device to said server; and replaces, in said received frames, each IP address of the interconnection device and port number allocated by the interconnection device to a server with the IP address and port number of the corresponding server.

13 Claims, 4 Drawing Sheets

Figure 1:
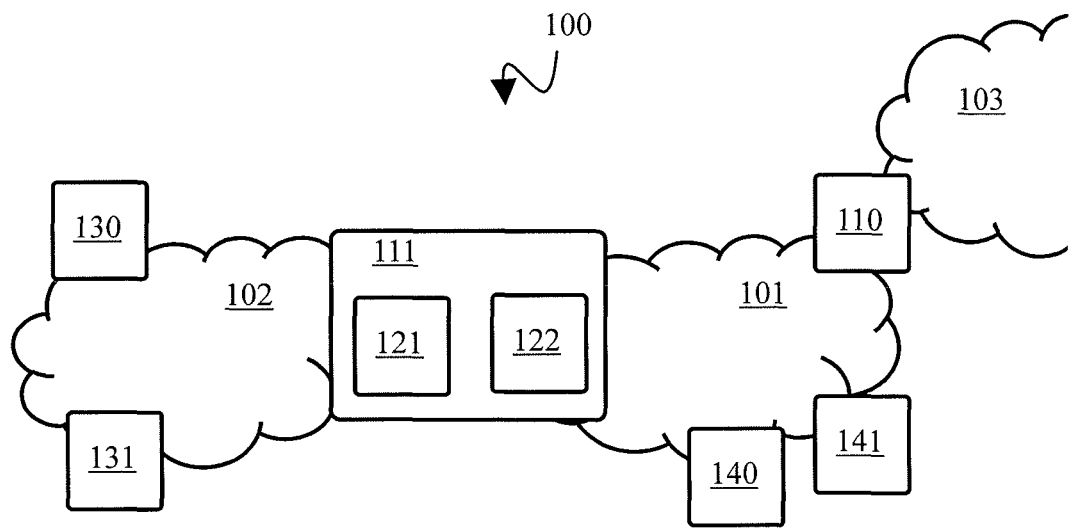

(51) Int. Cl.
  *H04L 12/28* (2006.01)
  *H04L 61/2521* (2022.01)
  *H04L 61/59* (2022.01)
  *H04L 61/5007* (2022.01)
  *H04L 45/74* (2022.01)
  *H04L 49/15* (2022.01)

(52) U.S. Cl.
  CPC .............. *H04L 45/74* (2013.01); *H04L 49/15* (2013.01); *H04L 61/2528* (2013.01); *H04L 61/2585* (2013.01); *H04L 61/5007* (2022.05); *H04L 61/59* (2022.05)

(58) Field of Classification Search
  USPC ........................................................ 709/223
  See application file for complete search history.

(56) References Cited

U.S. PATENT DOCUMENTS

| | | | |
|---|---|---|---|
| 2009/0094317 A1* | 4/2009 | Venkitaraman | H04L 29/12311 709/203 |
| 2009/0268668 A1* | 10/2009 | Tinnakornsrisuphap | H04L 12/2889 370/328 |
| 2010/0077064 A1* | 3/2010 | Viger | H04L 12/4633 709/221 |

OTHER PUBLICATIONS

Aug. 9, 2013 Search Report issued in International Patent Application No. PCT/EP2013/060283.

Nov. 25, 2014 International Preliminary Report on Patentability issued in International Application No. PCT/EP2013/060283.

"Discussion on requirements for digital content sharing with LIPA;" 3GPP Draft; S1-094015, 3rd Generation Partnership Project (3GPP), Mobile Competence Centre; Nov. 16, 2009; XP050395999.

"Enabling UPnP/DLNA multicast traffic with LIPA Solution 1;" 3GPP Draft; S2-102569 LIPA DLNA Proxy V2, Mobile Competence Centre; May 4, 2012; XP050434700.

Oh et al; "The DLNA Proxy System Architecture for Sharing In-Home Media Contents via Internet;" International Conference on Advanced Communication Technology; vol. 6; Feb. 20, 2006; pp. 1855-1858; VP003017690.

Stevens; "TCP Keepalive Timer;" TCP/IP Illustrated; col. 1; The Protocals; Chapter 23.

* cited by examiner

DEVICE AND METHOD FOR INTERCONNECTING TWO SUBNETWORKS

The present invention concerns the implementation of exchanges in accordance with the UPnP standard in a context of interconnection of first and second sub-networks, the first sub-network being a local network to which a gateway connecting the first sub-network to a third sub-network, such as the Internet, is connected.

In the world of mobile telephony, a femtocell is a cell in a mobile telephony cellular system, offering limited radio coverage and generally dedicated to domestic use. The base station, referred to as femto, responsible for managing the femtocell connects to the network of the mobile telephony operator via an Internet gateway.

Let us consider devices in accordance with the UPnP ("Universal Plug n'Play") standard as defined in the document "*UPnP Device Architecture* 1.1" from the UPnP Forum dated 15 Oct. 2008 or one of the revisions thereof. Given that the Internet gateway has no knowledge of the femtocell, masked by the femto, there does not exist any routing rule enabling a UPnP device in the local network and a UPnP mobile terminal of the femtocell to know each other and to get in contact. Furthermore, as the addressing domains are distinct between the local network and the femtocell, if a UPnP device of the local network were to address frames to an IP ("Internet Protocol") address as defined in the standard document RFC 791) routable over the femtocell, this would lead the Internet gateway to transfer these frames over the Internet, which is not the desired behaviour.

It should be noted that the UPnP standard defines data exchanges to the HTTP ("HyperText Transfer Protocol", as defined in the standard document RFC 2616) format that can be transported by UDP ("User Datagram Protocol" as described in the standard document RFC 768) or via TCP ("Transmission Control Protocol" as defined in the standard document RFC 793).

This problem occurs in the case of two sub-networks interconnected by an interconnection device, when one of these sub-networks is connected to a gateway that has no knowledge of the other sub-network. This could be the case when the interconnection device is an IP bridge and the two sub-networks are of LAN (Local Area Network) type. This problem also occurs when the gateway allows the interconnection of a local network to yet another sub-network, whether it is the Internet or another technology supporting IP transmissions.

It is desirable to overcome these various drawbacks of the prior art. It is more particularly desirable to provide a solution that allows the discovery of services and the exchange of data between UPnP devices situated on either side of a femto. It is also desirable to provide a solution that enables modifying the UPnP protocol for these requirements, and which enables preserving the current behaviour of the gateways, such as the Internet gateways.

The invention concerns a method for interconnecting first and second sub-networks, said first sub-network being a local network to which a gateway connecting said first sub-network to a third sub-network is connected, said first and second sub-networks being adapted for enabling UPnP devices to be connected thereto, each UPnP device comprising at least one server associated with an IP address and a port number. The method is such that an interconnection device interconnecting said first and second sub-networks performs the following steps: determining, for said first and second sub-networks, actual IP addresses and port numbers of servers of UPnP devices; allocating a port number to each of said servers; establishing, upon receiving a connection request corresponding to a port number allocated by the interconnection device to one said server, a connection between the interconnection device and said server, and a connection between the interconnection device and the UPnP device that sent said request; and, in at least one frame, received by the interconnection device via one of said connections: replacing in said frame each actual IP address and port number of a server belonging to the sub-network where said frame was sent by an IP address of the interconnection device, usable for routing the data over the sub-network other than the one to which said server is connected among said first and second sub-networks, and the port number allocated by the interconnection device to said server; and replacing, in said frame, each IP address of the interconnection device usable on the sub-network where the frame was sent and port number allocated by the interconnection device to a server by the IP address and the port number of the corresponding server.

The implementation of this double connection in which the interconnection device fulfils the role of a relay, and of these replacements of IP address and port number couples, allows discovery of services and exchange of data between UPnP devices situated on both sides of the interconnection device. Furthermore, the UPnP protocol has not been modified and the current behaviour of the gateways, such as the Internet gateways, is preserved.

According to a particular embodiment, the interconnection device determines the actual server IP addresses and port numbers from UDP datagrams transmitted by said servers during a UPnP discovery phase and, for each said UDP datagram, the interconnection device performs the following steps: replacing each actual server IP address and port number belonging to the sub-network where said UDP datagram was sent with an IP address of the interconnection device, usable for routing the data over the sub-network other than the one to which said server is connected among said first and second sub-networks, and the port number allocated by the interconnection device to said server; and replacing each IP address of the interconnection device usable on the sub-network where said UDP datagram was sent and port number allocated by the interconnection device to a server by the IP address and the port number of the corresponding server.

According to a particular embodiment, the interconnection device firstly subscribes, on each of the first and second sub-networks, to predefined IP address and port number to which the multicast UDP datagrams transmitted during the UPnP discovery phase are sent, and listens out for UDP datagrams transmitted to said IP address of the interconnection device and to the port number allocated by the interconnection device to said server. This then involves the multicast UDP datagrams and the unicast UDP datagrams that constitute the responses to these multicast UDP datagrams.

According to a particular embodiment, the second sub-network being a femtocell, the interconnection device subscribes, on each of the first and second sub-networks, to said predefined IP address and port number, when the interconnection device detects the presence of a UPnP mobile terminal in the femtocell.

According to a particular embodiment, the interconnection device determines the actual server IP addresses and port numbers, from HTTP frames transported by TCP frames received by the interconnection device via said connections.

According to a particular embodiment, the interconnection device performs the following steps: checking whether the actual port number of a server is already allocated by the interconnection device to another server; allocating to the server the same port number as said actual port number, in the case of positive verification; otherwise allocating another port number to the server.

According to a particular embodiment, the interconnection device analyses an HTTP header in the frames received by the interconnection device via one of said connections, and the interconnection device performs a frame modification only if the CONTENT-TYPE field of the HTTP header is of the text type.

According to a particular embodiment, the interconnection device analyses an HTTP header in the frames received by the interconnection device via one of said connections and, if the HOST field is present in the HTTP header, the interconnection device performs the following steps: if the IP address contained in the HOST field is a server address, replacing said IP address with an IP address of the interconnection device, usable for routing the data over the sub-network other than the one to which said server is connected among said first and second sub-networks; and, if the IP address contained in the HOST field is an IP address of the interconnection device, replacing said IP address with the IP address of the server with which a said connection is established and which is connected to the sub-network other than the one from which said frames are received among said first and second sub-networks.

According to a particular embodiment, after having established said connections, the interconnection device performs the following steps: activating a timer having a predefined duration; verifying whether at least one frame is received by the interconnection device via at least one of said connections; and closing said connections when no frame has been received by the interconnection device via at least one of said connections before expiry of said timer.

According to a particular embodiment, the interconnection device also closes said connections when said interconnection device receives, via one of said connections, a connection closure request for said connection.

According to a particular embodiment, the second sub-network is a femtocell and the gateway is an Internet gateway.

The invention also concerns an interconnection device intended to interconnect first and second sub-networks, said first sub-network being a local network to which a gateway connecting said first sub-network and a third sub-network is connected, said first and second sub-networks being adapted for enabling connecting UPnP devices thereto, each UPnP device comprising at least one server associated with an IP address and a port number. The interconnection device is such that it comprises: means for determining, for said first and second sub-networks, actual IP addresses and port numbers of servers of UPnP devices; means for allocating a port number to each of said servers; means for establishing, upon receiving a connection request corresponding to a port number allocated by the interconnection device to one said server, a connection between the interconnection device and said server, and a connection between the interconnection device and the UPnP device that sent said request; means for receiving at least one frame via one of said connections; means for replacing in said frame each actual IP address and port number of a server belonging to the sub-network where said frame was sent with an IP address of the interconnection device, usable for routing the data over the sub-network other than the one to which said server is connected among said first and second sub-networks, and the port number allocated by the interconnection device to said server; and means for replacing in said frame each IP address of the interconnection device usable on the sub-network where the frame was sent and port number allocated by the interconnection device to a server by the IP address and the port number of the corresponding server.

According to a particular embodiment, the interconnection device comprises: a discovery assistant module adapted for analysing and modifying UDP datagrams transmitted by servers during a UPnP discovery phase; an address-translation module adapted for analysing and modifying HTTP frames transmitted by servers via said connections.

According to a particular embodiment, the second sub-network is a femtocell and the gateway is an Internet gateway.

The invention also concerns a computer program that can be stored on a medium and/or downloaded from a communication network in order to be read by a processor. This computer program comprises instructions for implementing the method mentioned above when said program is executed by the processor. The invention also concerns storage means comprising such a computer program.

Figure 2:
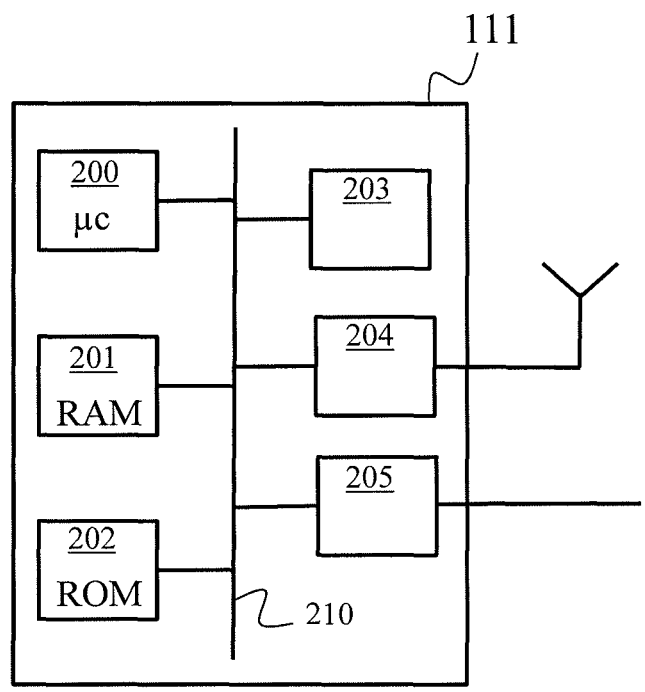
Figure 3:
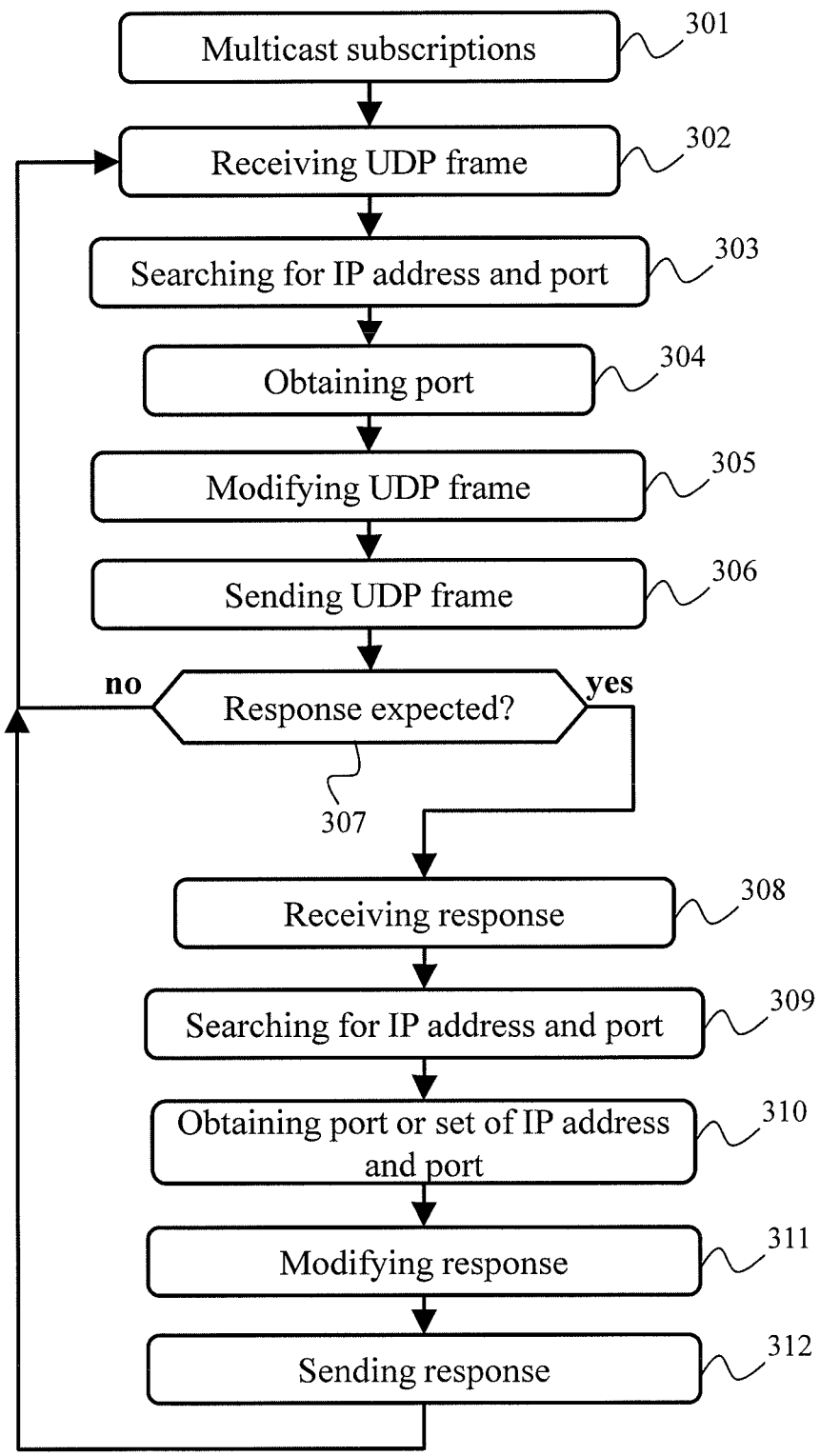
Figure 4:
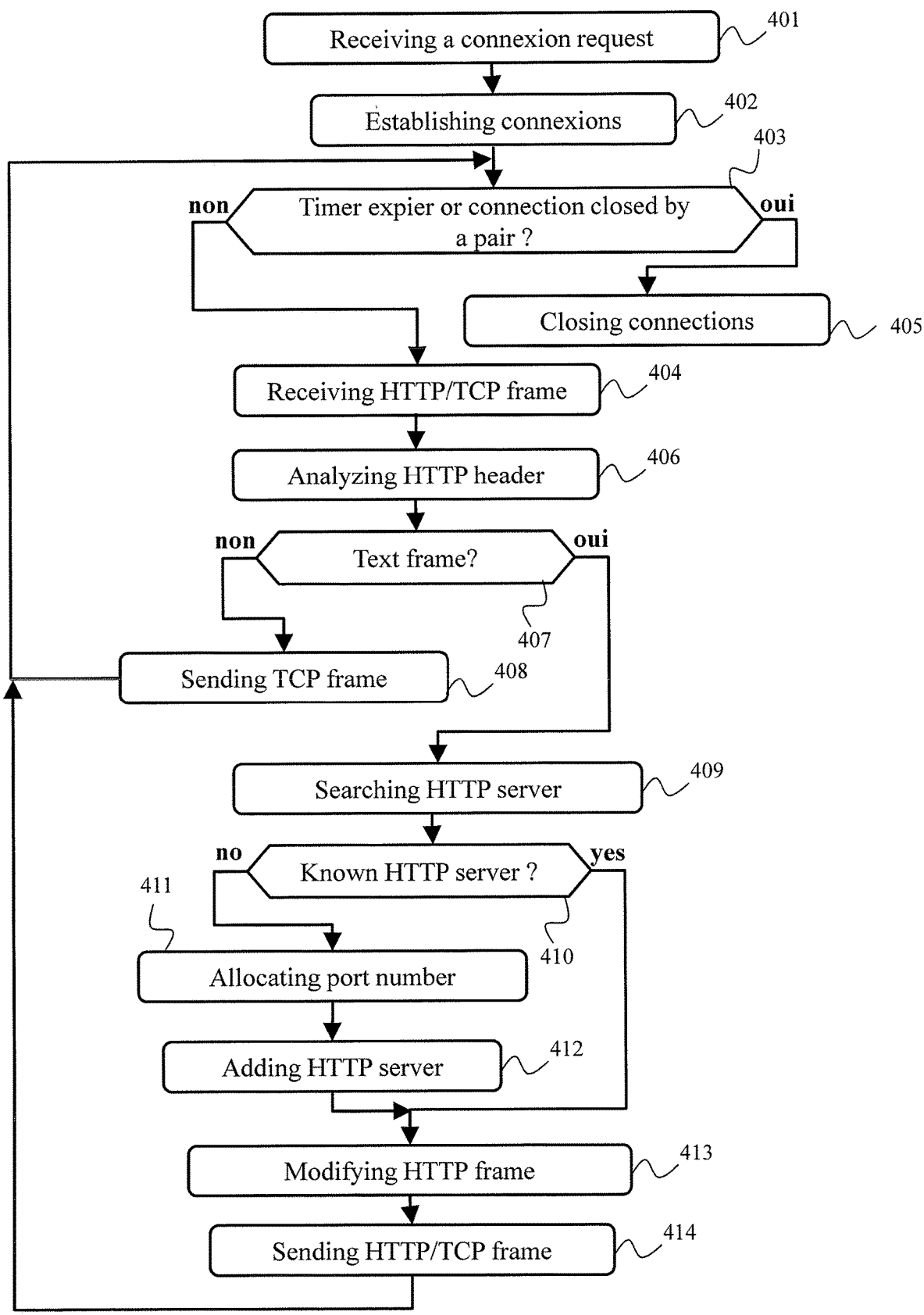
Figure 5:
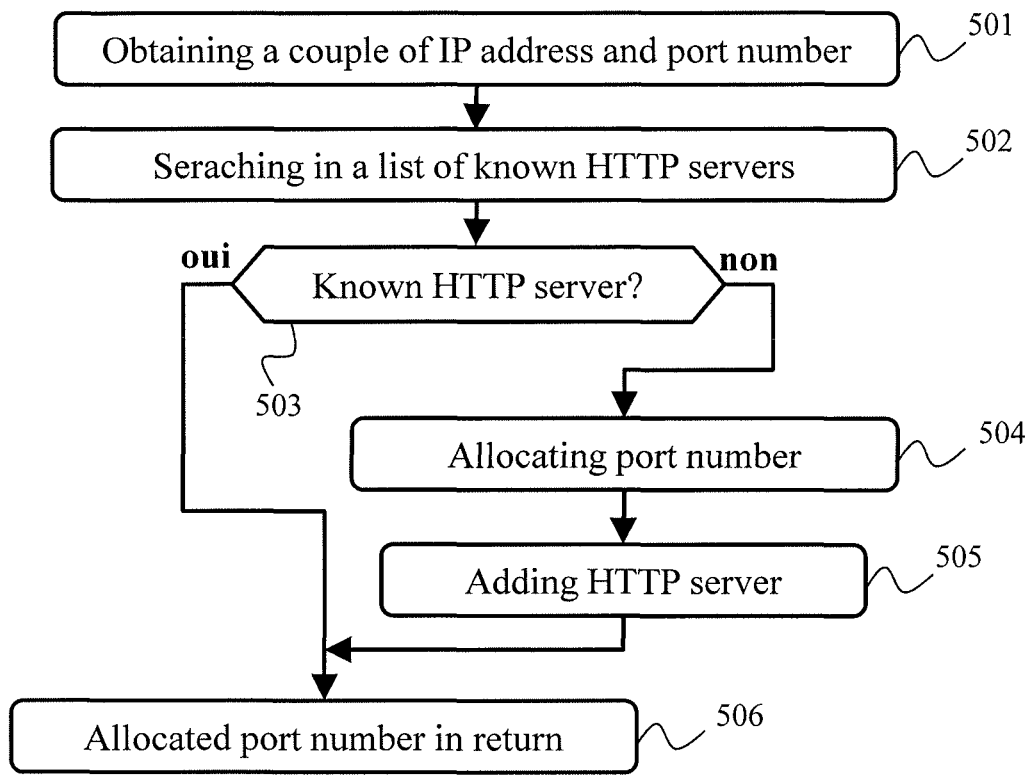
Figure 6:
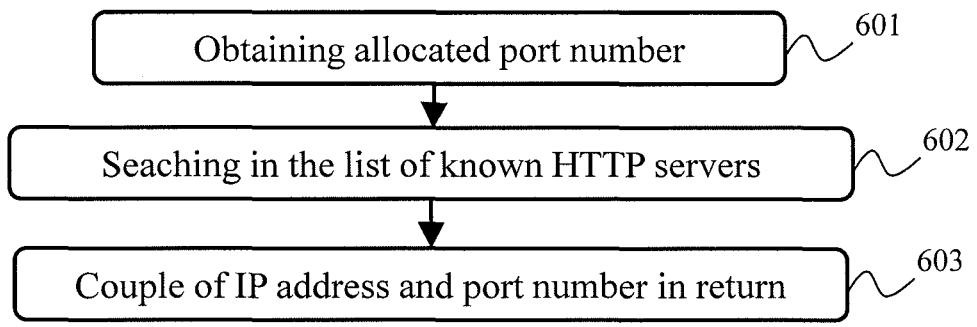

The features of the invention mentioned above, as well as others, will emerge more clearly from a reading of the following description of an example embodiment, said description being given in relation to the accompanying drawings, among which:

FIG. 1 schematically illustrates a communication network in which the invention may be implemented;

FIG. 2 schematically illustrates an example of an architecture of a femto of the communication network;

FIG. 3 schematically illustrates an HTTP server discovery algorithm implemented by the femto;

FIG. 4 schematically illustrates an algorithm, implemented by the femto, for modifying HTTP frames transmitted via TCP connections;

FIG. 5 schematically illustrates an algorithm, implemented by the femto, for obtaining a port number allocated by the femto from an IP address and a port number which correspond to an HTTP server;

FIG. 6 schematically illustrates an algorithm, implemented by the femto, from obtaining an IP address and a port number which correspond to an HTTP server, from a port number allocated by the femto.

Hereinafter, an implementation of the invention is presented in the context of an interconnection between a first sub-network of the LAN type and a second sub-network 102 of the femtocell type, an Internet gateway being connected to the first sub-network. As already mentioned, the invention can also be implemented in the context of an interconnection between first and second sub-networks, for example both of the LAN type, a gateway connecting one of the sub-networks to a third sub-network providing the routing of packets at the IP level and not having knowledge of the other sub-network among the first and second sub-networks.

FIG. 1 schematically illustrates a communication network 100 in which the invention may be implemented. The communication network 100 comprises a first sub-network 101 of the LAN type and a second sub-network 102 of the femtocell type. The first 101 and second 102 sub-networks are interconnected by a base station 111, responsible for managing the second sub-network 102. The base station 111 is therefore an interconnection device between the first 101 and second 102 sub-networks. The base station 111 is hereinafter referred to as femto, the first sub-network is referred to as LAN and the second sub-network is referred to as femtocell.

The LAN 101 is for example a network in accordance with the Ethernet standard, as defined by IEEE 802.3, or the WiFi standard as defined by IEEE 802.11.

An Internet gateway 110 is connected to the LAN 101 and enables interconnecting the LAN 101 with the Internet 103. The Internet gateway 110 routes the IP packets between the LAN 101 and the Internet 103. It also preferably fulfils the function of dynamic configuration of the IP hosts by means of the DHCP (Dynamic Host Configuration Protocol, as defined in the standard document RFC 1531 and revisions thereof).

At least one device 140, 141 implementing the UPnP standard is also connected to the LAN 101. Preferably, the device 140 is a UPnP control point.

At least one mobile terminal 130, 131 also implementing the UPnP standard is connected to the femtocell 102.

The femto 111 comprises a first module 121, referred to as discovery assistant, enabling the UPnP devices connected to the LAN 101 to discover the mobile terminals UPnP connected to the femtocell 102 and their UPnP services, and vice versa. The femto 111 comprises a second module 122, referred to as HTTP NAT (where NAT stands for Network Address Translator), providing communication between the UPnP devices connected to the LAN 101 and the UPnP mobile terminals connected to the femtocell 102, and vice versa. The term HTTP NAT comes from the fact that the address translation is done at the transport level, but also at the HTTP level. The behaviour of the discovery assistant 121 and of the HTTP NAT 122 is detailed hereafter in relation to FIGS. 3 to 6.

FIG. 2 schematically illustrates an example of architecture of the femto 111. The femto 111 then comprises, connected by a communication bus 210: a processor or CPU (Central Processing Unit) 200; a random access memory RAM 201; a read only memory ROM 202; a storage unit or a storage medium reader, such as a hard disk drive HDD 203; a communication interface 204 for creating the femtocell 102 and communicating with the mobile terminals 130, 131; and a communication interface 205 for connecting to the LAN 101 and communicating with the devices 140, 141.

The processor 200 is capable of executing instructions loaded into the RAM 201 from the ROM 202, an external memory (not shown), a storage medium such as the HDD 203, or a communication network. When the femto 111 is powered up, the processor 200 is capable of reading instructions from the RAM 201 and executing them. These instructions form a computer program causing the implementation, by the processor 200, of all or some of the algorithms described hereafter. All or some of the algorithms described hereafter may be implemented in software form by execution of a set of instructions by a programmable machine such as a DSP (Digital Signal Processor) or a microcontroller, or be implemented in hardware form by a machine or a dedicated component such as an FPGA (Field-Programmable Gate Array) or an ASIC (Application-Specific Integrated Circuit).

FIG. 3 schematically illustrates an algorithm implemented by the femto 111 for discovering HTTP servers. In the context of FIG. 1, the algorithm is more particularly implemented by the discovery assistant 121.

In a step 301, the discovery assistant 121 subscribes, both on the femtocell 102 and on the LAN 101, to the IP multicast address and to the port to which the UPnP devices send discovery messages. According to the UPnP standard, this IP address is "239.255.255.250" and the port number is "1900". Thus, when a UPnP device connected to the femtocell 102 or to the LAN 101 initiates a discovery phase, the discovery assistant 121 receives each corresponding UDP frame. This is because, in accordance with the UPnP standard, the frames relating to discovery are transmitted by means of the SSDP protocol (Simple Service Discovery Protocol), i.e. to the HTTP format encapsulated in UDP datagrams.

In a particular embodiment, the discovery assistant 121 performs these subscriptions, on both the femtocell 102 and the LAN 101, when the femto 111 detects the present of a UPnP mobile terminal in the femtocell 102.

In a following step 302, the discovery assistant 121 receives a multicast UDP frame intended for the IP address "239.255.255.250" and the port number "1900".

In a following step 303, the discovery assistant 121 seeks an HTTP server in the received frame. The discovery assistant 121 then scans the received UDP frame in order to detect IP addresses of devices belonging to the sub-network, femtocell 102 or LAN 101, from which it was sent. The discovery assistant 121 analyses in particular the field LOCATION. If the IP address is accompanied by a port, an HTTP server is detected and the set formed by this IP address and this port number is supplied to the HTTP NAT 122. The HTTP NAT 122 then returns a port number, that the discovery assistant 121 obtains in a following step 304. The allocation of a port number by the HTTP NAT 122 is described hereafter in relation to FIG. 5.

In a following step 305, the discovery assistant 121 modifies the received UDP frame by replacing the IP address and the port number of the detected HTTP server by respectively an IP address of the femto and the port number supplied the HTTP NAT 122. This IP address of the femto is the one allocated to the femto on the sub-network, femtocell 102 or LAN 101, other than the one where the detected HTTP server is connected. This is because the femto 11 has two IP addresses, one used for routing the IP frames in the femtocell 102 and the other used for routing IP frames in the LAN 101. The steps 303 to 305 are reiterated until the received frame has been completely parsed.

In a following step 306, the discover assistant 121 sends the modified UDP frame over the other sub-network, femtocell 102 or LAN 101, i.e. the sub-network that is not the one from which it was received in the step 302.

In a following step 307, the discovery assistant 121 determines whether the received UDP frame in the step 305 requires a response. Such is the case with search messages (in accordance with the UPnP standard, also referred to as M-SEARCH messages). If such is the case, a step 308 is performed; otherwise the discovery assistant 121 awaits a new multicast UDP frame and the step 302 is reiterated.

In the step 308, the discovery assistant 121 listens for UDP datagrams transmitted to the IP address of the femto 111 and the port number allocated to the HTTP server, and receives the expected response. The discovery assistant 121 then, in a following step 309, searches for an HTTP server in the received response. The discovery assistant 121 scans the received response in order to detect IP addresses of devices. If the IP address is not an IP address of the femto 111 and is accompanied by a port, an HTTP server is detected and the set formed by this IP address and this port number is supplied to the HTTP NAT 122. The HTTP NAT 122 then returns a port number, that the discovery assistant 121 obtains in a following step 310. If the IP address is an IP address of the femto 111, this IP address and the port number that is associated therewith in the response are supplied to the HTTP NAT 122. The HTTP NAT 122 in return supplies the set formed by the actual IP address and port number of the HTTP server.

In a following step 311, the discovery assistant 121 modifies the received response by replacing the IP address and the port number of the HTTP server detected by respectively the IP address of the femto 111, that is used for routing the IP frames over the sub-network other than the one to which the detected HTTP server is connected, and the port number supplied by the HTTP NAT 122, or by replacing the IP address of the femto 111 and the associated port number with respectively the actual IP address and port number of the HTTP server. The steps 309 to 311 are reiterated until the received response is completely parsed.

In a following step 312, the discovery assistant 121 sends the modified response over the other sub-network, femtocell 102 or LAN 101, i.e. the sub-network that is not the one from which it was received in the step 308. The discovery assistant 121 then awaits a new multicast UDP frame and the step 302 is reiterated.

In this way, a discovery phase initiated on one of the sub-networks, femtocell 102 or LAN 101, is extended by the femto 111 to the other sub-network. By replacing the sets formed by the IP addresses and the port numbers of the devices of a sub-network with the appropriate IP address of the femto 111 and the port numbers allocated by the femto 111, each UPnP service is seen from the other side of the femto 111 as if it were implemented by the femto 111.

FIG. 4 schematically illustrates an algorithm, implemented by the femto 111, for modifying HTTP frames exchanged in the context of the UPnP standard via TCP connections. In the context of FIG. 1, the algorithm is more particularly implemented by the HTTP NAT 122.

In a step 401, the HTTP NAT 122 receives a TCP connection request from a UPnP device or control point present on one of the sub-networks, femtocell 102 or LAN 101. This is because, outside the discovery phase, the messages exchanged in the context of the UPnP standard use the TCPIP protocol. This connection request is addressed to the femto and specifies a port number. The HTTP NAT 122 then finds the HTTP server to which this port number was previously allocated, which indicates thereto the HTTP server actually addressed.

In a following step 402, the HTTP NAT 122 establishes connections with the UPnP devices on each side of the femto. In other words, a first TCP connection is established between the requesting UPnP device and the femto 111, and a second TCP connection is established between the femto 111 and the HTTP server actually addressed, the femto 111 performing a relay between these TCP connections. For the HTTP NAT 122, these connections are associated with each other.

In a following step 403, the HTTP NAT 122 starts a timer having a predefined duration and awaits TCP frames. If no TCP frame is received by the HTTP NAT 122 at the expiry of this timer, the HTTP NAT 122 closes the two associated connections in the context of the TCP relay in a step 405. Thus only the TCP connections actually useful are maintained. The same applies if the HTTP NAT 122 receives a connection closure request from the UPnP control point or the HTTP server. The algorithm is then terminated. Otherwise, at least one TCP frame then being received, the HTTP NAT 122 performs a step 404.

In the following step 404, the HTTP NAT 122 receives a TCP frame from the UPnP device 140 or from the UPnP mobile terminal 130, and, in a following step 406, the HTTP NAT 122 analyses the TCP frame in order to know whether it is the first TCP frame of an HTTP frame. If such is the case, the HTTP NAT 122 receives TCP frames until having recovered the whole HTTP header. The HTTP NAT 122 analyses this header in order to determine whether the CONTENT-TYPE field indicates a MIME (Multipurpose Internet Mail Extension) of the "text" type. This is because the CONTENT-TYPE field of the messages exchanged in the context of the UPnP standard indicates a MIME extension of the "text" type. This allows not to scan, in the context of the modification of the IP addresses and associated ports, frames that do not relate to the UPnP standard, and therefore to preserve the resources of the HTTP NAT 122. Thus, in a following step 407, the HTTP NAT 122 checks whether the CONTENT-TYPE field indicates a MIME extension of the "text" type. If such is the case, a step 409 is performed; otherwise a step 408 is performed.

In the step 408, the HTTP NAT 122 retransmits the TCP frame data received via the other sub-network without making any change. Since the HTTP frame can be received over several TCP frames, all the data of these frames are retransmitted without change via the other network. The HTTP NAT 122 then awaits new data and the step 403 is reiterated.

In the step 409, the HTTP NAT 122 recovers the whole HTTP frame, which can be received via several TCP frames. The field CONTENT-LENGTH enables the HTTP NAT 122 to determine the size of the HTTP frame. The HTTP NAT 122 performs a search for an HTTP server in the recovered HTTP frame. The HTTP NAT 122 scans the received HTTP frame in order to detect IP addresses of devices. If the IP address is an IP address of the femto 111, this IP address and the port number that is associated with it in the HTTP frame received enables the HTTP NAT 122 to find the set formed by the actual IP address and port number of the HTTP server. If the IP address is not an IP address of the femto 111 and is accompanied by a port, an HTTP server is detected. The HTTP NAT 122 then determines, in a following step 410, whether this HTTP server is already known, i.e. whether it was for example previously detected by the discovery assistant 121. If the HTTP server is already known to the HTTP NAT 122, a step 413 is performed, otherwise a step 411 is performed.

In the step 411, the HTTP NAT 122 allocates a port number to the detected HTTP server and adds it, in a step 412, to a list of known HTTP servers, in correspondence with the allocated port number and the IP address of the femto 111 that can be used on the sub-network other than the one to which the HTTP server is connected. This enables discovering UPnP devices directly during data exchanges via the HTTP protocol transported in the TCP frames. The step 413 is then performed.

In the step 413, the HTTP NAT 122 modifies the received HTTP frame by replacing the IP address and the port number of the detected HTTP server with respectively the IP address of the femto 111, usable on the sub-network other than the one to which the HTTP server is connected, and the port number supplied by the HTTP NAT 122, or by replacing the IP address of the femto 111 and the associated port number with respectively the actual IP address and port number of the HTTP server. The steps 409 to 413 are reiterated until the received HTTP frame has been completely parsed.

A particular case concerns the field HOST of the HTTP header, since it contains an IP address but no port. The HTTP NAT 122 then treats it as follows. If it is an IP address of a UPnP device or of a UPnP mobile terminal on one of the sub-networks, it is replaced with the IP address of the femto 111 routable over the other sub-network. If it is an IP address of the femto, it is replaced by that of the concerned HTTP server. The HTTP NAT 122 in this case has no need of a port number since the field HOST can only represent one of the devices of the associated TCP connections. If the IP address contained in the field HOST is an HTTP server address, the HTTP NAT 122 replaces it with an IP address of the interconnection device, usable for routing the data over the sub-network other than the one to which said HTTP server is connected. And, if the IP address contained in the field HOST is an IP address of the femto 111, the HTTP NAT 122 replaces it with the IP address of the server with which a connection is established and which is connected to the sub-network other than the one from which the HTTP frame is received.

Following the changes made to the HTTP frame, the field CONTENT-LENGTH may have to be changed in order to represent the new size of the HTTP frame.

In a following step 414, the HTTP NAT 122 sends the modified HTTP frame over the other sub-network, femtocell 102 or LAN 101, i.e. the sub-network that is not the one from which the HTTP frame was received in the step 404. The HTTP frame is transported via the TCP protocol, by means of the connection existing between the femto 111 and the UPnP device or the UPnP mobile terminal on the other sub-network. The HTTP NAT 122 then awaits new data and the step 403 is reiterated.

FIG. 5 schematically illustrates an algorithm implemented by the femto 111 for obtaining a port number allocated by the femto 111 from an actual IP address and port number of the HTTP server. In the context of FIG. 1, the algorithm is more particularly implemented by the HTTP NAT 122.

In a step 501, the HTTP NAT 122 obtains a set formed by an actual IP address and port number of a HTTP server. This information is supplied by the discovery system 121 in the step 303 or in the step 309, or obtained by the HTTP NAT 122 in the step 409.

In a following step 502, the HTTP NAT 122 seeks whether this HTTP server is listed in a list of HTTP servers known from the HTTP NAT 122. This list comprises the couples of IP addresses and port numbers of the HTTP servers known to the HTTP NAT 122, in correspondence with the port number that the HTTP NAT 122 allocated thereto and the IP address of the femto 111 usable on the sub-network other than the one to which the HTTP server is connected.

In a following step 502, the HTTP NAT 122 determines whether the HTTP server is known. If such is not the case, a step 504 is performed; otherwise a step 506 is performed.

In the step 504, the HTTP NAT 122 allocates a port number to the HTTP server. For example, the HTTP NAT 122 keeps the port number of the HTTP server if this is not already allocated to another HTTP server that is on the same sub-network and is present in the list of HTTP servers known to the HTTP NAT 122; otherwise the HTTP NAT 122 allocates another port number that is not already allocated to an HTTP server that is on the same sub-network and that is present in the list.

In a following step 505, the HTTP NAT 122 adds the HTTP server to the list of HTTP servers known to the HTTP NAT 122, i.e. the HTTP NAT 122 stores the actual IP address and port number of the HTTP server, in correspondence with the port number allocated by the HTTP NAT 122 and the IP address of the femto 111 usable on the sub-network other than the one to which the HTTP server is connected. The step 506 is then performed.

In the step 506, the HTTP NAT 122 returns at least the port number that the HTTP NAT 122 has allocated to the HTTP server.

FIG. 6 schematically illustrates an algorithm implemented by the femto 111 for obtaining an actual IP address and port number of HTTP server, from a port number allocated by the femto 111 and an IP address of the femto 111. In the context of FIG. 1, the algorithm is more particularly implemented by the HTTP NAT 122.

In a step 601, the HTTP NAT 122 obtains a port number that the HTTP NAT 122 previously allocated to an HTTP server, as well as the IP address of the femto 111 with which this port is associated. This information is supplied by the discovery assistant 121 at the step 309, or obtained by the HTTP NAT 122 at the step 409.

In a following step 602, the HTTP NAT 122 seeks which HTTP server is listed in the list of HTTP servers known to the HTTP NAT 122 in correspondence with this IP address of the femto 111 and this port number allocated by the HTTP NAT 122.

In a following step 603, the HTTP NAT 122 returns the set formed by the actual IP address and port number of the server HTTP as listed in the list of HTTP servers known to the HTTP NAT 122.

The invention claimed is:

1. An interconnection method for interconnecting first and second sub-networks, said first and second sub-networks being adapted for enabling UPnP devices to be connected thereto, each UPnP device comprising at least one server associated with an IP address and a port number, wherein an interconnection device interconnecting said first and second sub-networks performs the following first steps in the case where the interconnection device detects the presence of a UPnP mobile terminal:

subscribing, on both the first and second sub-networks, to a predefined IP address and port number to which multicast UDP datagrams transmitted during a UPnP discovery phase are sent, listening out for UDP datagrams transmitted to said predefined IP address and the port number allocated by the interconnection device to said server;

and after said first steps, the interconnection device performs:

determining, for said first and second sub-networks, actual IP addresses and port numbers of servers of UPnP devices from received frames representative of discovery messages transmitted by said UPnP devices;

allocating a different port number to each one of said servers and storing in a list the actual IP address and port number of each one of said servers in correspondence with the port number allocated to said server by the interconnection device and the IP address of the interconnection device usable on the sub-network other than the one to which the server is connected;

establishing, upon receiving a connection request corresponding to a port number allocated to one of said servers by the interconnection device, a connection between the interconnection device and said server, and a connection between the interconnection device and the UPnP device that sent said request, the interconnection device performing a relay between these connections;

and, in at least one frame sent from the first sub-network and received by the interconnection device via one of said connections, the interconnection device having two IP addresses for communicating between the first and second networks, a first IP address being used for routing frames in the first sub-network and a second IP address for routing frames in the second sub-network:

modifying the received at least one frame by replacing each actual IP address and port number of a first server belonging to the first sub-network with the second IP address of the interconnection device that is associated with the second sub-network and the port number allocated to said first server;

modifying the received at least one frame by replacing each IP address of the interconnection device associated with the first sub-network and the port number allocated to a second server belonging to the second sub-network with the actual IP address and the port number of said second server determined from said list; and transmitting said frame thus modified over a sub-network chosen among the first and second sub-networks, the chosen sub-network being the one from which the interconnection device has not received said frame.

2. The interconnection method according to claim 1, wherein the interconnection device determines the actual server IP addresses and port numbers, from UDP datagrams transmitted by said servers during a UPnP discovery phase and, for each said UDP datagram, the interconnection device performs:

replacing each actual IP address and port number of server belonging to the sub-network where said UDP datagram was sent with an IP address of the interconnection device, usable for routing the data over the sub-network other than the one to which said server is connected among said first and second sub-networks, and the port number allocated by the interconnection device to said server; and replacing each IP address of the interconnection device usable on the sub-network where said UDP datagram was sent and port number allocated by the interconnection device to a server by the actual IP address and the port number of the corresponding server; and transmitting said UDP datagram thus modified over a sub-network chosen among the first and second sub-networks, the chosen sub-network being the one from which the interconnection device has not received said UDP datagram.

3. The interconnection device according to claim 1, wherein the interconnection device determines the actual server IP addresses and port numbers, from HTTP frames transported by TCP frames received by the interconnection device via said connections.

4. The interconnection method according to claim 1, wherein the interconnection device performs:

checking whether the actual port number of a server is already allocated by the interconnection device to another server;

allocating to the server the same port number as said actual port number, in case of positive verification;

otherwise allocating another port number to the server.

5. The interconnection method according to claim 1, wherein the interconnection device analyses an HTTP header in the frames received by the interconnection device via one of said connections, and the interconnection device makes a frame modification only if the CONTENT-TYPE field of the HTTP header is of the text type.

6. The interconnection method according to claim 1, wherein the interconnection device analyses an HTTP header in the frames received by the interconnection device via one of said connections and, if the HOST field is present in the HTTP header, the interconnection device performs:

if the IP address contained in the HOST field is a server address, replacing said IP address with an IP address of the interconnection device, usable for routing the data over the sub-network other than the one to which said server is connected among said first and second sub-networks; and if the IP address contained in the HOST field is an IP address of the interconnection device, replacing said IP address with the IP address of the server with which a said connection is established and which is connected to the sub-network other than the one from which said frames are received among the first and second sub-networks.

7. The interconnection method according to claim 1, wherein, after having established said connections, the interconnection device performs:

activating a timer having a predefined duration;

verifying whether at least one frame is received by the interconnection device via at least one of said connections; and closing said connections when no frame has been received by the interconnection device via at least one of said connections before expiry of said timer.

8. The interconnection method according to claim 7, wherein the interconnection device also closes said connections when said interconnection device receives, via one of said connections, a connection closure request for said connection.

9. The interconnection method according to claim 1, wherein in at least one frame sent from the second sub-network and received by the interconnection device:

modifying the received at least one frame by replacing each actual IP address and port number of a third server belonging to the second sub-network with the first IP address of the interconnection device that is associated with the first sub-network and the port number allocated to said third server;

modifying the received at least one frame by replacing each IP address of the interconnection device associated with the second sub-network and the port number of a fourth server belonging to the first sub-network with the actual IP address and the port number of said fourth server determined from said list.

10. An interconnection device intended to interconnect first and second sub-networks, said first and second sub-networks being adapted for enabling connecting UPnP devices thereto, each UPnP device comprising at least one server associated with an IP address and a port number wherein the interconnection device comprises circuitry adapted to perform the following first steps in the case where the interconnection device detects the presence of a UPnP mobile terminal:

subscribing, on both the first and second sub-networks, to a predefined IP address and port number to which multicast UDP datagrams transmitted during a UPnP discovery phase are sent, listening out for UDP datagrams transmitted to said predefined IP address and the port number allocated by the interconnection device to said server;

and after said first steps, to perform:

determining, for said first and second sub-networks, actual IP addresses and port numbers of servers of UPnP devices from received frames representative of discovery messages transmitted by said UPnP devices;

allocating a different port number to each one of said servers and storing in a list the actual IP address and port number of each one of said servers in correspondence with the port number allocated to said server by the interconnection device and the IP address of the interconnection device usable on the sub-network other than the one to which the server is connected;

establishing, upon receiving a connection request corresponding to a port number allocated to one of said servers by the interconnection device, a connection between the interconnection device and said server, and a connection between the interconnection device and the UPnP device that sent said request, the interconnection device performing a relay between these connections;

and, in at least one frame sent from the first sub-network, and received by the interconnection device via one of said connections, the interconnection device having two IP addresses for communicating between the first and second networks, a first IP address being used for routing frames in the first sub-network and a second IP address for routing frames in the second sub-network:

modifying the received at least one frame by replacing each actual IP address and port number of a first server belonging to the first sub-network with the second IP address of the interconnection device that is associated with the second sub-network and the port number allocated to said first server;

modifying the received at least one frame by replacing each IP address of the interconnection device associated with the first sub-network and the port number allocated to a second server belonging to the second sub-network with the actual IP address and the port number of said second server determined from said list; and transmitting said frame thus modified over a sub-network chosen among the first and second sub-networks, the chosen sub-network being the one from which the interconnection device has not received said frame.

11. The interconnection device according to claim 10, comprising:
   a discovery assistant module adapted for analysing and modifying UDP datagrams transmitted by servers during a UPnP discovery phase; and
   an address-translation module adapted for analysing and modifying HTTP frames transmitted by servers via said connections.

12. A non-transitory computer-readable storage medium storing a computer program comprising instructions for implementing, by an interconnection device, the method according to claim 1, when said program is executed by a processor of the interconnection device.

13. The interconnection device according to claim 10, wherein said circuitry is further adapted to perform in at least one frame sent from the second sub-network and received by the interconnection device:
   modifying the received at least one frame by replacing each actual IP address and port number of a third server belonging to the second sub-network with the first IP address of the interconnection device that is associated with the first sub-network and the port number allocated to said third server;
   modifying the received at least one frame by replacing each IP address of the interconnection device associated with the second sub-network and the port number of a fourth server belonging to the first sub-network with the actual IP address and the port number of said fourth server determined from said list.

* * * * *